(12) United States Patent
Tsuchida

(10) Patent No.: US 6,659,406 B2
(45) Date of Patent: Dec. 9, 2003

(54) KNIFE STAND

(75) Inventor: Minoru Tsuchida, Chiba (JP)

(73) Assignee: Master Cutlery Corporation, Chiba (JP)

( * ) Notice: Subject to any disclaimer, the term of this patent is extended or adjusted under 35 U.S.C. 154(b) by 0 days.

(21) Appl. No.: 10/270,548

(22) Filed: Oct. 16, 2002

(65) Prior Publication Data

US 2003/0098398 A1 May 29, 2003

(30) Foreign Application Priority Data

Nov. 27, 2001 (JP) ........................................ 2001-360608

(51) Int. Cl.[7] .............................................. A47G 21/14
(52) U.S. Cl. ..................... 248/37.3; 211/70.7; 30/298.4
(58) Field of Search .............................. 248/37.3, 37.6; 211/70.7, 70.6; 30/298.4; 206/349, 483, 553, 564, 8, 81, 82, 83, 84; D7/637, 638

(56) References Cited

U.S. PATENT DOCUMENTS

| D135,186 S | * | 3/1943 | Miller .......................... D7/637 |
| D149,540 S | * | 5/1948 | Case et al. .................... D7/637 |
| 2,682,950 A | * | 7/1954 | Mercer et al. ............... 206/553 |
| 2,684,758 A | * | 7/1954 | Aquino ........................ 206/349 |
| 4,870,754 A | * | 10/1989 | Chiou ........................... 30/123 |
| 5,725,180 A | * | 3/1998 | Chamay et al. ............ 244/53 B |
| D411,718 S | * | 6/1999 | Davis et al. .................. D7/637 |
| 6,318,567 B1 | * | 11/2001 | Braley ........................ 211/70.7 |
| 6,371,312 B1 | * | 4/2002 | Tsuchida .................... 211/70.7 |

FOREIGN PATENT DOCUMENTS

FR 2663303 A1 * 12/1991 ................. 206/553

* cited by examiner

Primary Examiner—Ramon O Ramirez
Assistant Examiner—Jon Szumny
(74) Attorney, Agent, or Firm—Sughrue Mion, PLLC

(57) ABSTRACT

A knife stand is comprised of a cover plate and a container shaped main body. An upper aperture of the main body is covered with the cover plate. Insert slits are provided on the cover plate to insert a base part of knife holders into the main body. At least one or more holder parts are provided on a bottom face of the inner main body to fix and hold a base part of each of the knife holders after said knife holders are inserted into the main body. Slot shaped insert parts are provided on the knife holders, respectively. Both a blade part and a grip part are inserted into the knife holders by turning the whole edge of the blade downward. Similarly, both a blade part and a grip part are inserted into the holder by turning the whole edge of the blade downward as well. Each holder parts and the main body are integrally molded with plastic. The holder parts are provided on the bottom face of the inner main body.

5 Claims, 6 Drawing Sheets

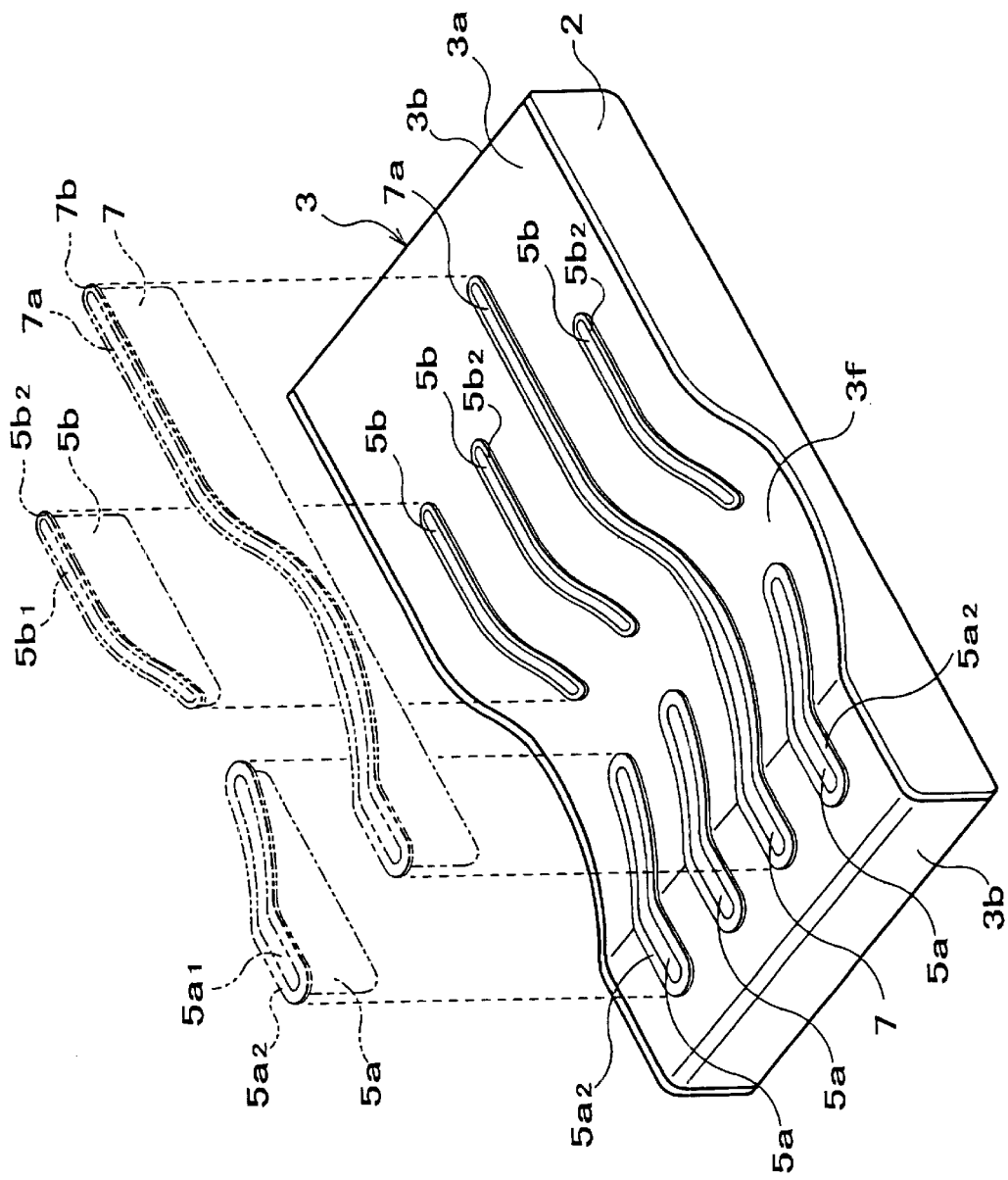

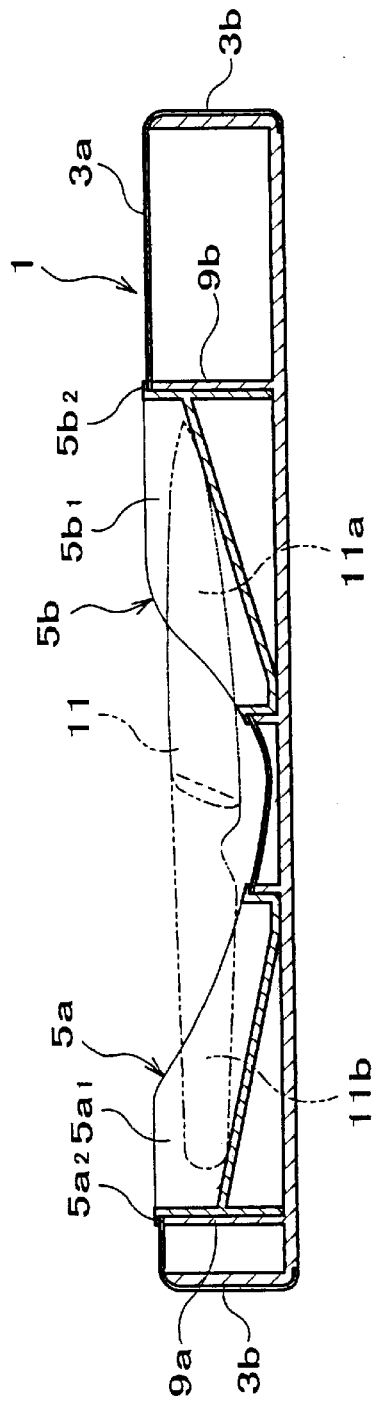
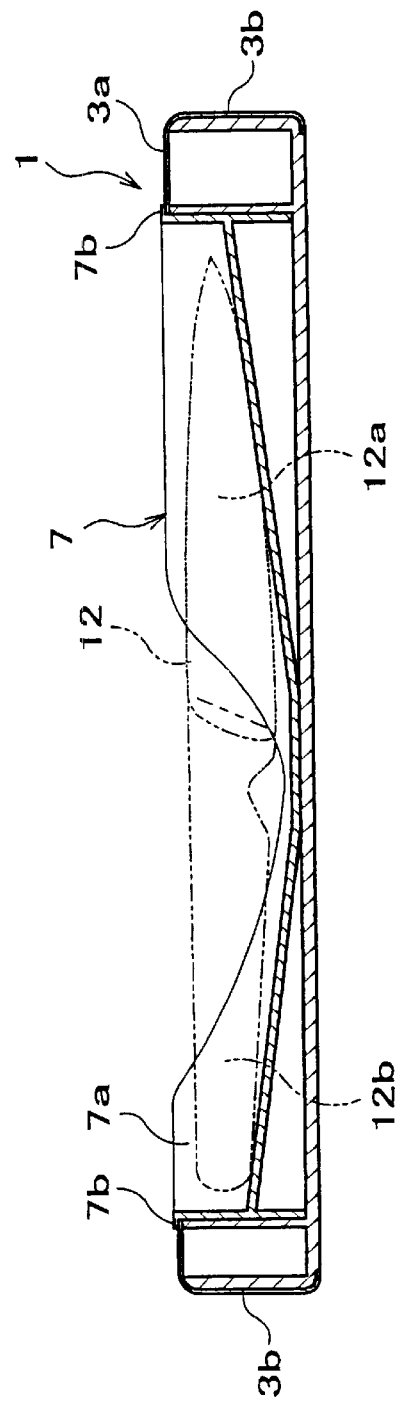

KNIFE STAND

BACKGROUND OF THE INVENTION

1. Field of the Invention

The present invention relates to a knife stand to store a cooking knife or the like, more particularly to a knife stand to laterally store a plurality of cooking knives.

2. Prior Art

There is a knife stand for arranging a plurality of cooking knives. This knife stand is generally made of wood, plastic, or metal. Conventionally, this kind of knife stand has been known as two types. One is a knife stand wherein a blade part of knife is vertically stored. The other one is a knife stand wherein a blade part of knife is laterally stored by turning whole edge of blade downward.

However, when a blade part of knife is vertically stored on the knife stand, knives probably fall down due to careless behavior or vibration since the center of gravity lies on the upper side of knife. Additionally, this type of knife stand can not be housed in a drawer as long as knives are vertically stored. On the other hand, the latter knife stand can be stored in the drawer even if knives are stored in the knife stand. However, it is difficult to take out knives from inside of the drawer.

The present invention has been made with the foregoing background in mind. The aim of the present invention is to offer a knife stand as following ways. It is very convenient for taking out the knife stand from, or putting it back, to inside of the drawer and is also easy for carrying and handling the knife stand.

SUMMARY OF THE INVENTION

To attain the object, the knife stand is comprised as follows;

As a first aspect of the present invention, an upper aperture of a container shaped main body is covered with a cover plate made of metal. At least one or more insert slits are provided on said cover plate to downwardly insert a base part of a knife holder into said main body. At least one or more holder parts are provided on the bottom face of inner main body to fix and hold a base part of the knife holder after said knife holder is inserted into said main body via said insert slit. A slot shaped insert part is provided on said knife holder to insert a knife. Herein a, whole edge of the blade is turned downward when a knife is inserted into said knife holder. Said main body, said knife holder, and said cover plate are formed, respectively, to provide the knife stand wherein one portion of a knife is seen from outside to enable the knife to be taken out from said knife holder.

Accordingly, it is easy to carry the knife stand since all knives are stably retained by being tightly stored in the knife stand. Still more, the total height of the knife stand is reduced so that the knife stand can be housed in common kitchen drawer. It is further possible to take out knives from the knife stand even if the knife stand is housed in the kitchen drawer.

As a second aspect of the present invention, a pair of engagement parts are provided on both ends of said cover plate to flexibly engage with both ends of the bottom face of said main body.

Accordingly, the main body and the cover plate are easily combined with each other. At the same time, they are easily dismantled so that the knife stand can be kept in clean condition.

As a third aspect of the present invention, when the main body and the cover plate are combined with each other, upper end face of said holder part of the main body and the back face of the cover plate are contacted with each other. Furthermore, a brim part is provided on each upper end face of said knife holders to downwardly press the cover plate into each upper end face of said holder parts so that the cover plate is fixed into each upper end face of said holder parts.

Accordingly, the main body and the cover plate are strictly combined without adding other mechanical clamping elements.

As a fourth aspect of the present invention, a bottom face of said slot shaped insert part is formed so as to store several knives of different lengths and blade shapes therein. At the same time, the bottom face is slanted so that both ends of the longitudinal direction of the knife are at a highest position.

Accordingly, several knives of different lengths and blade shapes can be stored between both ends of the knife holder.

As a fifth aspect of the present invention, said cover plate is made of anti-corrosive metal. Said holder part and said main body are integrally molded with plastic. Said knife holder is made of plastic. Accordingly, the knife stand can be kept in a clean condition during the long term service.

BRIEF DESCRIPTION OF THE DRAWINGS

FIG. 2 is a perspective view of the knife stand with regard to the present invention.

FIG. 3A is a cross sectional view of the knife stand with regard to the present invention indicating the state that a knife is stored in a combination of knife holders.

FIG. 3B is a cross sectional view of the knife stand with regard to the present invention indicating the state such that a knife is stored in a knife holder.

DETAILED EXPLANATION OF THE PREFERRED EMBODIMENTS OF THE INVENTION

The present invention is explained with reference to the accompanied drawings.

Figure 1:
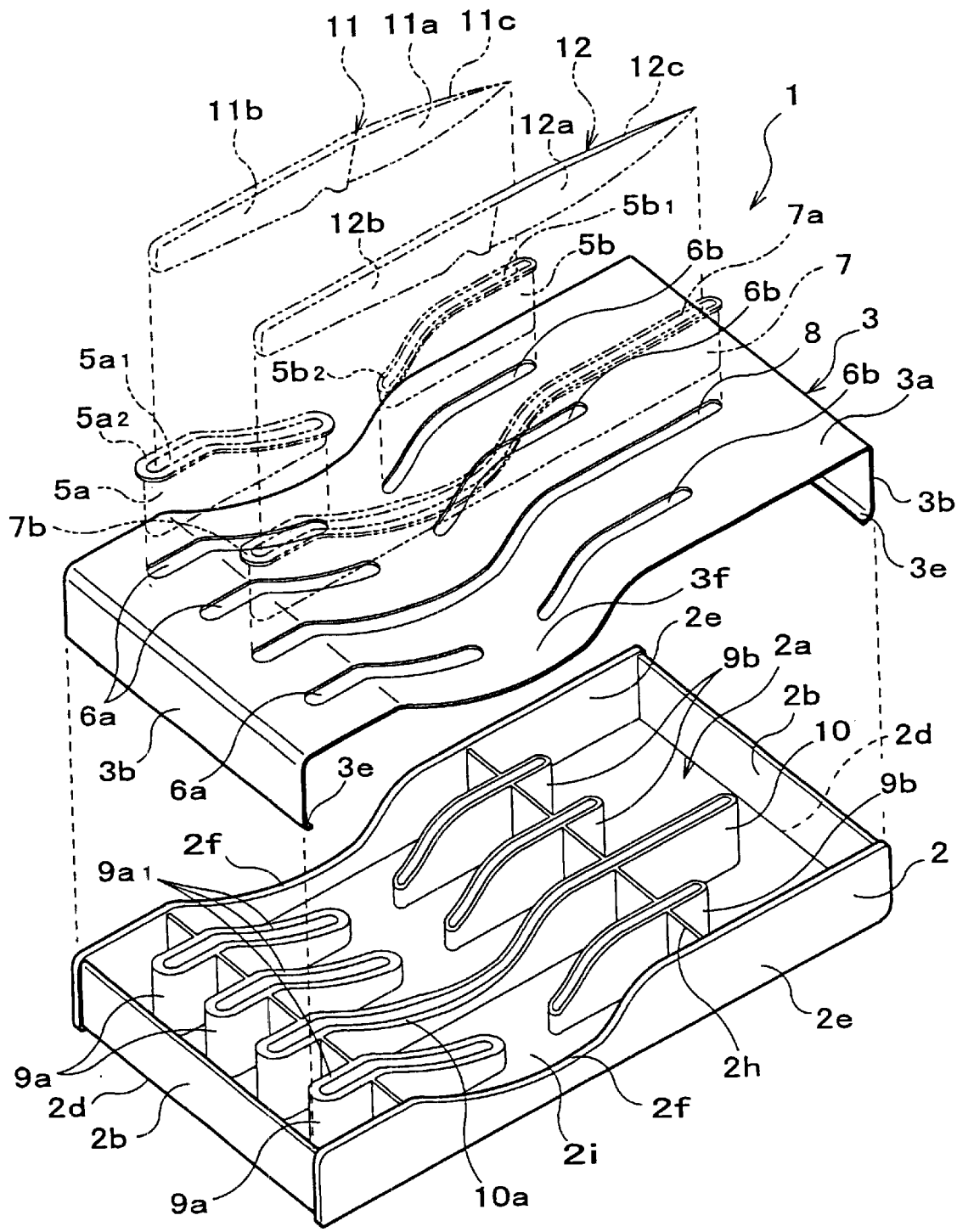
FIG. 1 is an analytical perspective view indicating a structure of the knife stand with regard to the embodiment of the present invention.

FIG. 1 indicates a structure of the knife stand wherein a long sized knife and a short sized knife are laterally stored. FIG. 2 is a perspective view of the knife stand wherein a main body, a cover plate, and knife holders are combined together. As FIG. 1 shows, a main body 2 of a knife stand 1 is formed as a container type having an upper aperture 2a. The upper aperture 2a is closed by a close part 3a of a cover plate 3 and the cover plate 3 is attached to the main body 2. The cover plate 3 is made of anti-corrosive metal such as stainless steel or the like. A pair of flange parts 3b are connected with both ends of the close part 3a to be fixed with a pair of side walls 2b of the main body 2. Herein, a pair of the side walls 2b are symmetrical. Additionally, a pair of engagement parts 3e are connected with lower end of the flange parts 3b, respectively, to be engaged with both ends 2d of a bottom face of the main body 2. Herein, a pair of engagement parts 3e can engage with and disengage from both ends 2d of the bottom face. Furthermore, said engagement parts 3e are nail-shape or the like.

At least one or more combinations of insert slits 6a and 6b are provided on the close part 3a of the cover plate 3 to insert the combination of the knife holders 5a and 5b into the main body 2. Similarly, at least one or more insert slits 8 are provided on the close part 3a of the cover plate 3 to insert the long sized knife holder 7 into the main body 2. Furthermore, at least one or more combination of holder parts 9a and 9b are provided on a bottom face 2i of the inner part of the main body 2 to fix and hold the combination of base part of the knife holders 5a and 5b on the main body 2, respectively. Similarly, at least one or more holder parts 10 are provided on the bottom face 2i to fix and hold a base part of the knife holder 7 on the main body 2.

At least one or more combination of the holder parts 9a and 9b, at least one or more holder parts 10, and the inner bottom face of the main body 2 are integrally molded. Furthermore, the main body 2, one or more combination of knife holders 5a and 5b, and the knife holders 7 are made of plastic.

A slot shaped insert part $5a_1$ is provided on the knife holder 5a to insert a grip part 11b of the knife 11 into said knife holder 5a. On the other hand, a slot shaped insert part $5b_1$ is provided on the knife holder 5b to insert a blade part 11a into said knife holder 5b. Herein, the knife 11 is inserted into said knife holder 5b by turning the whole edge of the blade downward. Similarly, a slot shaped insert part 7a is provided on the knife holder 7 to insert a blade part 12a and a grip part 12b of a knife 12 into said knife holder 7.

Furthermore, two concave areas 2f downwardly depressed from upper end of the main body 2 are provided on the substantially central portion of two side walls 2e of the main body 2. Herein, these two side walls 2e are perpendicular to said two side walls 2b. In the meantime, a bent area 3f is provided on the cover plate 3 to sit on the two concave areas 2f. At the same time, a holder part $9a_1$ for holding the bent area 3f is provided on the holder part 9a and 9b, respectively, to support the backside of the bent area 3f of the cover plate 3. Similarly, a holder part 10a for holding a bent area 3f of the cover plate 3 is provided on the holder part 10 to support the backside of the bent area 3f of the cover plate 3.

Accordingly, when the knife 11 is inserted into the combination of knife holders 5a and 5b, the substantially central portion of the knife 11 is seen from outside. Similarly, when the knife 12 is inserted into the knife holders 7, the substantially central portion of the knife 12 is seen from outside as well.

Consequently, the knife 11 and the knife 12 can easily be pinched by the fingertip for taking out from the knife holders. Furthermore, brim parts $5a_2$, $5b_2$ are provided on the upper end of the combination of the knife holders 5a and 5b to downwardly press the close part 3a of the cover plate 3. Similarly, a brim part 7b is provided on the knife holder 7 to downwardly press the close part 3a. What is more, a rib 2h is provided on said main body 2 in following manners. According to the case of FIG. 1, one side of side wall 2e, two holder parts 9a, the holder part 10, and the holder part 9a, and the other side of side wall 2e are jointed by the rib 2h. In the mean time, one side of side wall 2e, two holder parts 9b, the holder part 10, the holder part 9b, and the other side of side wall 2e are jointed by the rib 2h.

As shown in FIG. 1, when the cover plate 3 is downwardly pressed along two side walls 2b of the main body 2 by outwardly bending two flange portions 3b, a pair of engagement parts 3e of the cover plate 3 are engaged with both ends 2d of bottom face of the main body 2. Then, as shown in FIG. 2, the cover plate 3 and the main body 2 are unified with each other as if the main body 2 is wrapped with the cover plate 3. Sequentially, when the knife holders 5a, 5b, and 7 are inserted into insert slits 6a, 6b, and 8 of the cover plate 3, respectively, these knife holders 5a, 5b, and 7 are inserted into the main body via the insert slits 6a, 6b, and 8. Then, these knife holders 5a, 5b, and 7 are fixed into the holder parts 9a, 9b, and 10, which are unified with the bottom face 2i of inner face of the main body 2. Then, when the knife holders 5a, 5b, and 7 are further pressed into the holder parts 9a, 9b, and 10, respectively, the brim portions $5a_2$, $5b_2$, 7b are sat on the close part 3a of the cover plate 3. This is the state that knife holders 5a, 5b, and 7 are unified with the holder parts 9a, 9b, and 10. Consequently, brim parts $5a_2$, $5b_2$, 7b of the knife holders 5a, 5b, and 7 are clamped with the upper end of the knife holders. In the meantime, the cover plate 3 and the faces $9a_1$, $10a$ for supporting the bend area are clamped. Consequently, the cover plate 3 is prevented from being moved to forward, backward, right and leftward.

Therefore, even if the main body 2 is carried by hands when the knife 11 is stored in the knife holders 5a, 5b while the knife 12 is stored in the knife holder 7, the drawback mentioned in prior art will be eliminated. Additionally, the knife 11 is inserted into the main body 2 via slot shaped insert parts $5a_1$ and $5b_1$ by turning whole blade part 11a downward. Similarly, the knife 12 is inserted into the main body 2 via the slot shaped insert part 7a by turning whole blade part 12a downward as well. Accordingly, the total height of the knife stand is reduced. At the same time, the knife stand can be housed in the common kitchen drawer even though knives are stored in the knife stand. Furthermore, all of the knives 11 can be taken out one by one from the knife holders 5a, 5b, while all of knives 12 can be taken out one by one from the knife holder 7 even under the condition that the knife stand 1 is housed in the drawer.

Therefore, according to the knife stand 1 with regard to the present embodiment, it is very convenient not only for taking out the knife stand from, or putting it back, to inside of the drawer but also for carrying and treating the knife stand. Furthermore, since the main body 2, the knife holders 5a, 5b, and 7, and the holder parts 9a, 9b, and 10 are made of plastic, while the cover plate 3 is made of anti-corrosive metal, the knife stand can be kept in clean condition during the long term service.

FIG. 3A indicates a state that the knife 11 is stored into a combination of knife holders 5a and 5b. On the other hand, FIG. 3B indicates a state that the knife 12 is stored into the knife holder 7. As shown in FIG. 3A, the depth of the slot shaped insert parts $5a_1$ and $5b_1$ slantingly varies. Herein, both ends of a longitudinal direction of the knife 11 are of the shallowest position. On the other hand, the center of the longitudinal direction of the knife 11 is at the deepest position. This structure allows several kinds of knives having different lengths and blade shapes to be inserted through the length between the end of knife holder 5a and the end of knife holder 5b. Of course, the depths of the slot shaped insert parts $5a_1$ and $5b_1$ are set, so as to completely insert the blade part 11a and the grip part 11b of the knife 11 through the length between the ends of the slot shaped insert parts $5a_1$ and $5b_1$. On the other hand, the depth of the center of said longitudinal direction of the knife 11 is set so that both left and right sides of the central portion of the knife 11 are seen from the outside due to said concave areas 2f and 2f as shown in FIG. 1.

Similarly, as shown in FIG. 3B, the depth of the slot shaped insert part 7a slantingly varies. Herein, both ends of the longitudinal direction of the knife 12 are at the shallowest position. On the other hand, the center of the longitudinal direction of the knife 12 is at the deepest position. This structure allows several kinds of knives having different lengths and blade shapes to be inserted through the length between both ends of knife holder 7 as well as the case of the insert parts $5a_1$ and $5b_1$. Of course, the depth of the slot shaped insert part 7a is set so as to completely insert the blade part 12a and the grip part 12b of the knife 12 through the length between both ends of insert part 7a. On the other hand, the depth of the center of said longitudinal direction of the knife 12 is set so that both left and right sides of the central portion of the knife 12 are seen from the outside due to said concave areas 2f as shown in FIG. 1. Additionally, a plurality of concave parts having different sizes, respectively (not shown), can also be provided on the bottom face of the slot shaped insert part 7a in order to store a blade part and a grip part of different kinds of knives 11 and 12 thereon. Thereby, these concave parts prevent the knife 11 and 12 from being moved in the longitudinal direction. Accordingly, the knife stand can be carried by hands in a stable condition.

Figure 4:
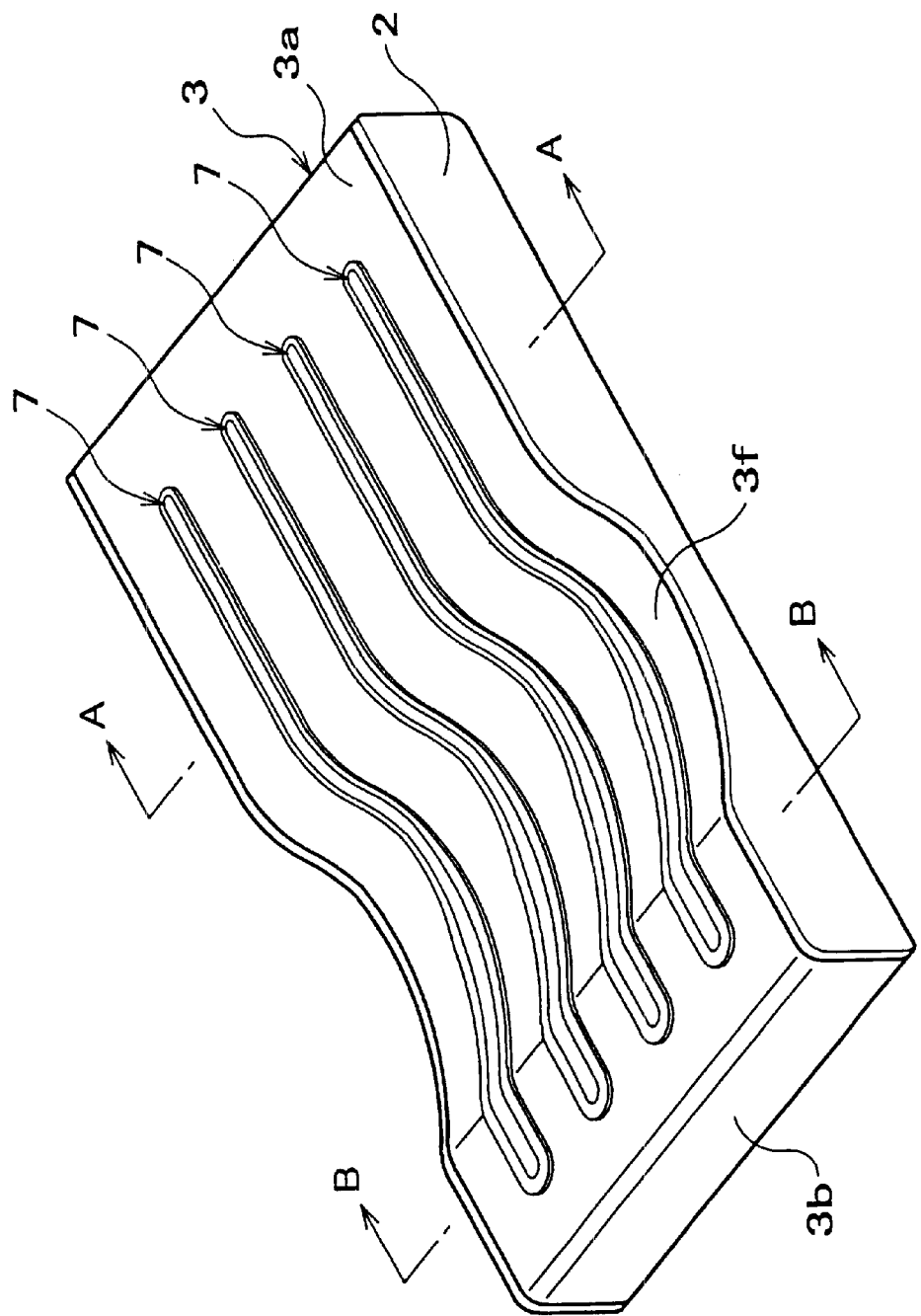
FIG. 4 is a perspective view indicating the other embodiment of the knife stand with regard to the present invention.

Herein, according to the explanation of the present embodiment, at least one or more knife holders 7 are provided on the knife stand to store the long sized knife 12 in addition to at least one or more combination of knife holders 5a and 5b. However, as another manner, the knife stand can also be constituted so as to provide only at least one or more knife holders 7 thereon as shown in FIG. 4. In this case, a plurality of concave parts having different sizes, respectively (not shown), are provided on the bottom face of the slot shaped insert part 7a so as to store several kinds of knives 12 having different lengths and blade shapes thereon for gaining a stable condition.

Figure 5:
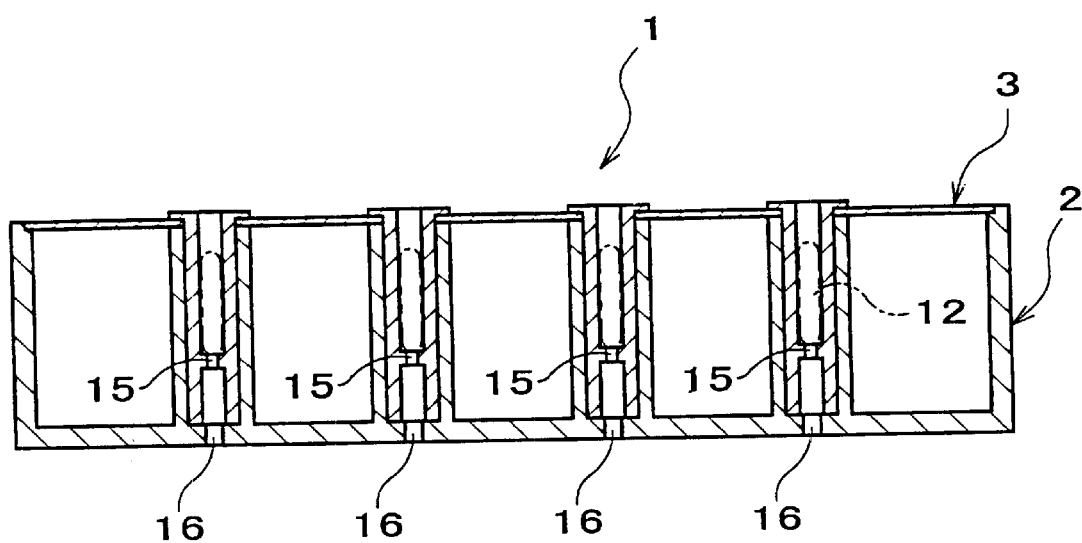
FIG. 5 is a cross sectional view taken along the A—A line in FIG. 4 wherein weep holes are provided on a bottom face of both the knife holder and the main body to drip water.

Furthermore, as shown in FIG. 5, which is a cross section taken along the A—A line in FIG. 4, weep holes 15 and 16 can be provided on the bottom face of the knife holder 7 and the bottom face of the main body 2 to drip water. This constitution allows the knife stand to be used in a more sanitary condition.

Figure 6:
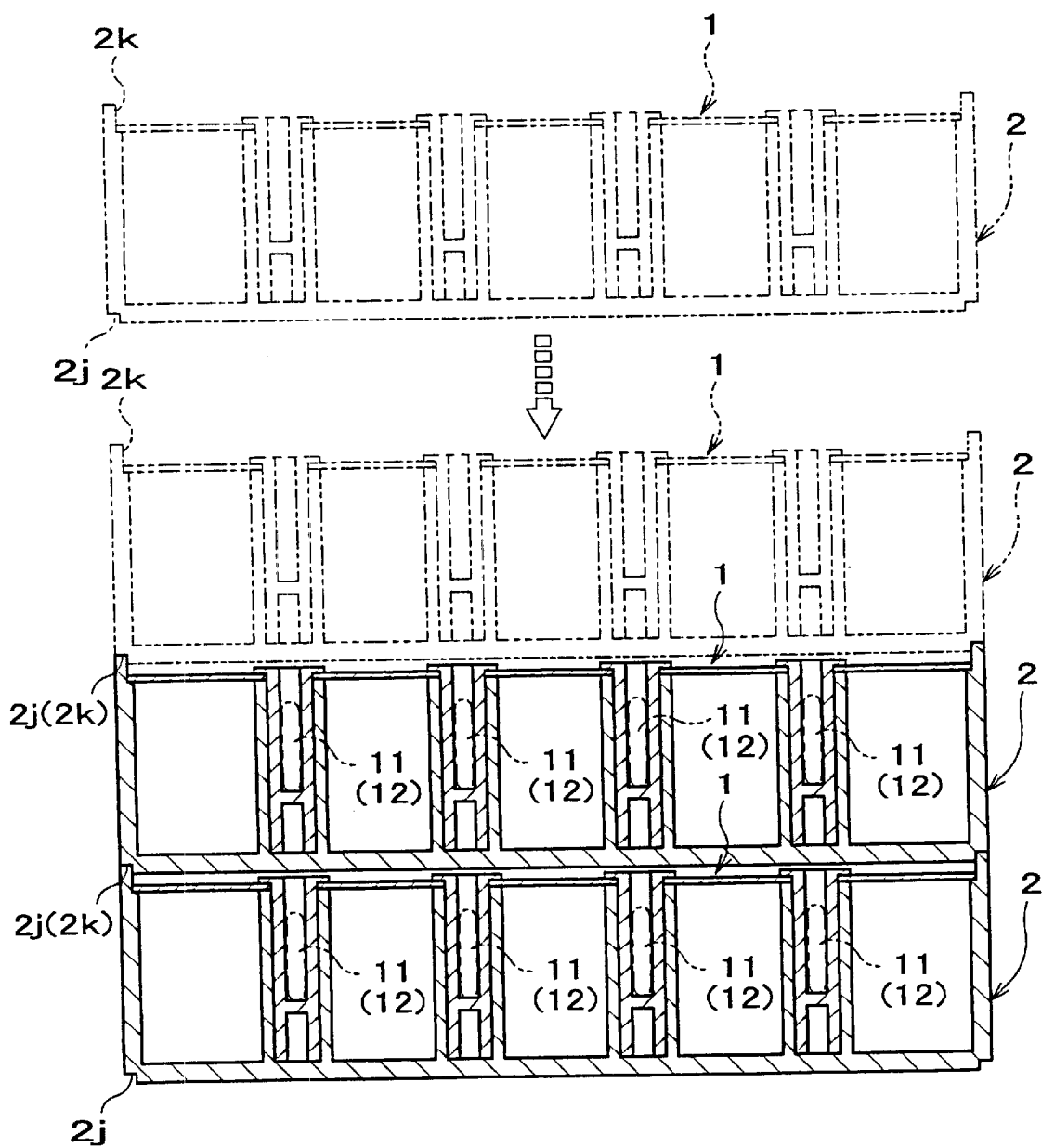
FIG. 6 is a cross sectional view taken along the B—B line in FIG. 4 wherein a protruded portion is provided along edge of upper face of the main body and a dent portion is provided along the edge of the bottom face of the main body.

What is more, as shown in FIG. 6, which is a cross section taken along the B—B line in FIG. 4, a protruded portion 2k can be provided along an edge of upper face of the main body 2 and a dent portion 2j can be provided along edge of bottom face of the main body 2 so that a plurality of the main bodies 2 can be piled up. Accordingly, a space can greatly be eliminated for housing the knife stand in the cupboard.

According to the aforementioned explanation, it is obvious that the knife stand with regard to the present invention can exhibit the following excellent effects.

(1) Even if the knife stand is carried by hands when knives are stored in the knife stand, it is easy because all knives are in stable condition. Furthermore, the total height of the knife stand is reduced so that the knife stand can be housed in the common kitchen drawer and each knife can be taken out easily.

(2) The cover plate can easily be attached to the main body. At the same time, the knife stand can easily be dismantled so that the knife stand can be kept in clean condition.

(3) No mechanical clamping element is required to combine the cover plate and the main body.

(4) Several kinds of knives having different lengths and blade shapes can be stored through the length between both ends of the knife holder.

(5) The knife stand can be kept in clean condition during the long term service.

What is claimed is:

1. A knife stand, comprising:
    at least one or more insert slits provided on a cover plate made of metal through which is inserted a base part of a knife holder into a main body,
    at least one or more holder parts provided on an inner bottom face of the main body to fix and hold the base part of the knife holder after said knife holder is inserted into said main body via said at least one or more insert slits,
    a slot shaped insert part provided on said knife holder to insert a knife into said knife holder by turning the whole edge of the blade downward, and
    said main body, said knife holder, and said cover plate being formed so that one portion of said knife is seen from the outside to enable the knife to be taken out from said knife holder.

2. The knife stand as set forth in claim 1, wherein a pair of engagement parts are provided on both ends of said cover plate to flexibly engage with both ends of the bottom face of said main body.

3. The knife stand as set forth in claim 1, wherein an upper end face of said at least one or more holder parts is contacted with a back face of said cover plate, and a brim part is provided on an upper end of said knife holder to fix said cover plate to the upper end face of said at least one or more holder parts by downwardly pressing said cover plate from the outside.

4. The knife stand as set forth in claim 1, wherein a bottom face of said slot shaped insert part is formed so as to store several kinds of knives having different lengths and blade shapes thereon, at the same time, said bottom face is slanted so that both ends of the longitudinal direction of the knife are at a highest position, while the center of the longitudinal direction of knife is at a lowest position.

5. The knife stand as set forth in claim 1, wherein said cover plate is made of anti-corrosive metal, said at least one or more holder parts and the main body are integrally molded with plastic, and said knife holder is molded with plastic.

* * * * *